July 10, 1951 T. H. SARCHET 2,559,801
BAKING APPARATUS
Filed Aug. 26, 1949 2 Sheets-Sheet 1
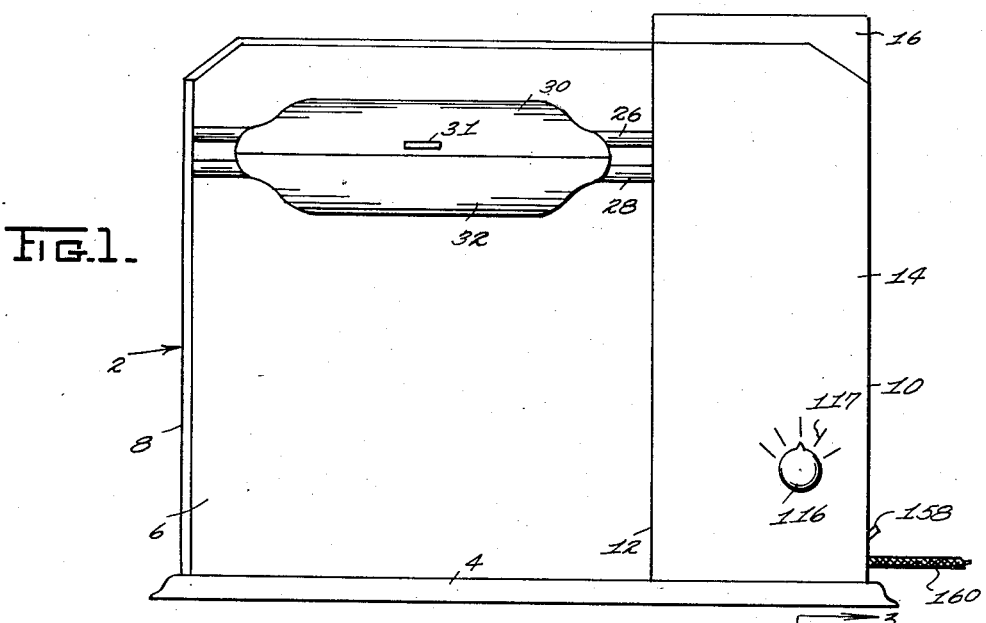
INVENTOR.
THOMAS H. SARCHET
BY
McMorrow, Berman & Davidson
ATTORNEYS July 10, 1951     T. H. SARCHET     2,559,801
BAKING APPARATUS
Filed Aug. 26, 1949     2 Sheets-Sheet 2
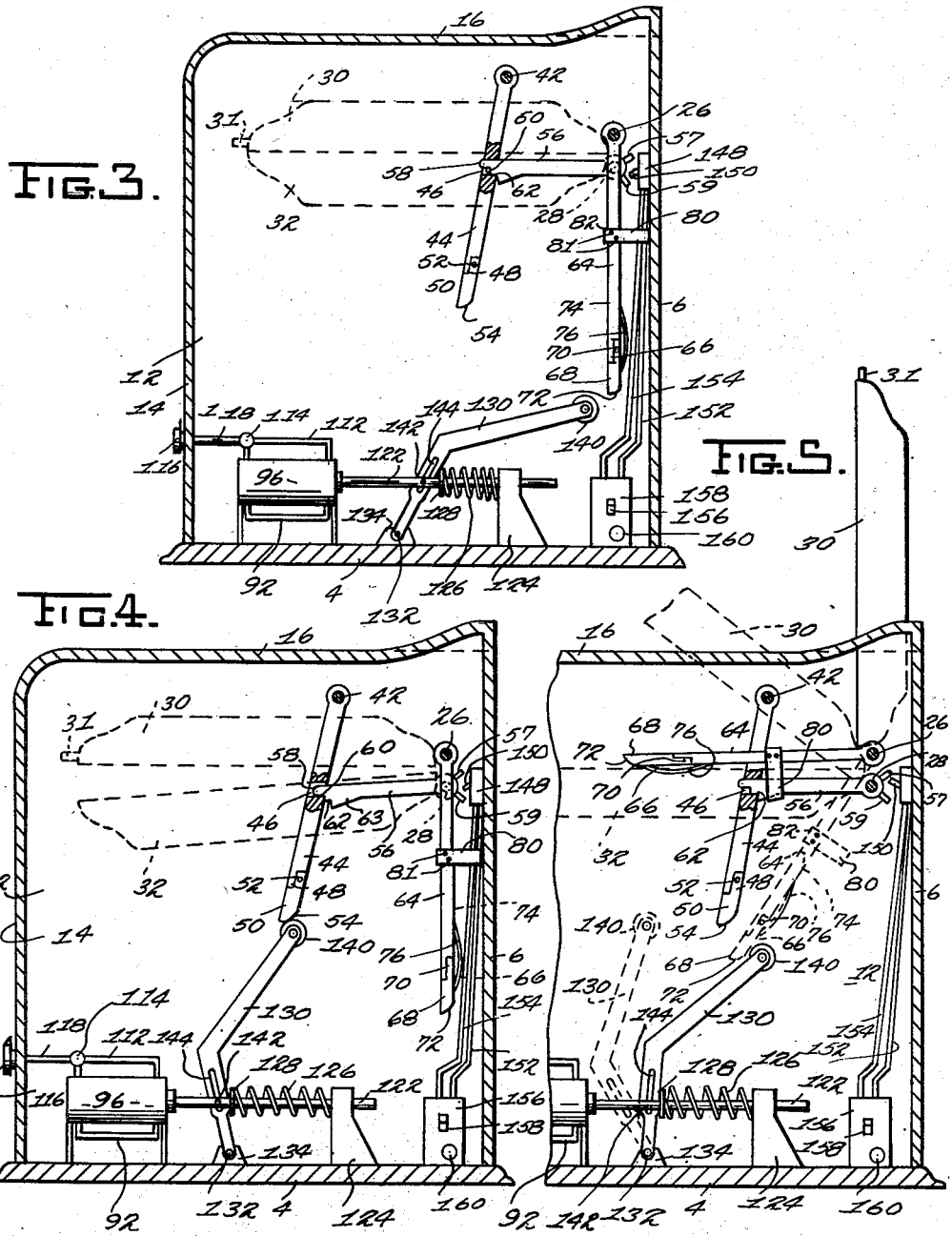
INVENTOR.
THOMAS H. SARCHET
BY
McMorrow, Berman + Davidson
ATTORNEYS Patented July 10, 1951

2,559,801

UNITED STATES PATENT OFFICE 2,559,801

BAKING APPARATUS

Thomas Hal Sarchet, Spokane, Wash.

Application August 26, 1949, Serial No. 112,484

4 Claims. (Cl. 99—380)

This invention relates to a waffle iron or to related baking and toasting apparatus. More specifically, the invention pertains to waffle or toasting apparatus conventionally employing a pair of oppositely-disposed, electrically-heated baking surfaces or grids.

The present invention has as one of its objects the provision of means for terminating the baking operation at the expiration of a predetermined time interval.

A further object of the invention is to provide means for automatically pre-heating the baking grids prior to the baking operation.

A still further object of this invention resides in the provision of means for separating the opposed baking grids in two or more successive stages.

Another object of this invention lies in the provision of hydraulic means for controlling the time interval of the baking operation.

Other and further objects and advantages of the present invention will become readily apparent from the following specification when read in the light of the appended drawings, in which:

Figure 1 is a front elevational view of a waffle iron or baking apparatus, showing the arrangement of the baking grids and other elements when the apparatus is operative;

Figure 2 is a front elevation, partially in cross-section, showing the relative positions of the actuating and control elements;

Figure 3 is a sectional view taken on the line 3—3 of Figure 2, disclosing the positions of the control and actuating elements when in their operative positions;

Figure 4 is a cross-sectional view similar to Figure 3, showing the relative positions of the grids, actuating and control elements during an intermediate stage of the baking operation;

Figure 5 is a fragmentary cross-sectional view similar to Figure 3, showing the component parts of the apparatus at the initial step of the baking operation;

Figure 6 is a cross-sectional view taken on line 6—6 of Figure 2.

Referring now more specifically to the drawings, reference numeral 2 designates, in general, an automatic waffle iron or baking apparatus constructed according to this invention. The apparatus comprises a housing having a base 4, an elongated vertical back wall 6, vertical side walls 8 and 10 secured to and positioned at right angles to the back wall 6, an intermediate wall 12 positioned between side walls 8 and 10, the intermediate wall 12 connecting with back wall 6 and being parallel to side walls 8 and 10, and a front panel 14 extending between and secured to intermediate wall 12 and side wall 10. Panel 14 is parallel to back wall 6. The housing 2 is completed by a top or closure plate 16 which extends across the top or upper edges of back wall 6, side wall 10, intermediate wall 12, and front panel 14, forming a closed compartment 15.

Preferably, housing 2 is formed of metal, though other suitable materials may be employed, and the component parts thereof may be secured in their relative positions by any means well known in the art.

As seen in Figure 2, side wall 8 is provided with a pair of vertically-spaced apertures 18 and 20 in alignment with vertically-spaced apertures 22 and 24, respectively, formed in intermediate wall 12.

One end of a shaft 26 is rotatively supported in aperture 18, while the other end is rotatably mounted in aperture 22 and is of sufficient length to project substantially half-way (see Figure 2) across chamber 15. In a similar manner, shaft 28 has one of its ends journaled for rotation in aperture 20, while the other end thereof is rotatably mounted in aperture 24 and projects therethrough and into chamber 15 a lesser distance than shaft 26.

Upper and lower baking grids 30 and 32 are each provided with conventional electric heating elements and leads (not shown), the grids being fixedly secured to shafts 26 and 28, respectively, to rotate therewith. Both grids are disposed between walls 8 and 12, and above base 4. Upper grid 30 is also provided with a handle 31.

Rigidly secured to the under side of the top 16 are two oppositely-disposed, L-shaped angle brackets 34 and 36 having depending arms 38 and 40, respectively, each of the arms being apertured to receive a pivot pin 42.

Adjacent its upper end, a lever bar 44 is pivotally mounted on pin 42, the bar being free to rotate in a plane perpendicular to the longitudinal axis of shafts 26 and 28.

As is more clearly shown in Figures 2 to 5, inclusive, a transverse passage 46 is formed in lever bar 44 intermediate its ends. The lower end of lever bar 44 is notched to provide an abutment 48 to limit the pivotal movement in a clockwise direction, as viewed in Figures 3 to 5, of a cam lever 50 provided with a cam surface 54, the cam lever being connected with the lower end of lever bar 44 by pivot pin 52.

One end of a lock-bar 56 is rigidly secured on that end of shaft 28 which projects within compartment 15. The free end 58 of lock-bar 56 is notched at spaced, stepped intervals 60 and 62 and is enlarged at 63.

Lever bar 44 and lock-bar 56 are aligned and adapted to swing in substantially the same plane. Lock-bar 56 is displaced rearwardly from lever bar 44 a distance sufficient to permit free end 58 and the notched portion 60 to enter passage 46, while notch 62 formed in the enlargement 63 is of too great a size to be slidably received in passage 46.

A pair of spaced, radially-projecting switch arms 57 and 59 extend from lock-bar 56 adjacent its connection with shaft 28. The function of these arms is described below.

A lever bar 64 has one of its ends rigidly secured to that end of the shaft 26 which projects within compartment 15, and the lower end of the former is notched to form an abutment 66 preventing clockwise movement, as viewed in Figures 3 to 5, of a cam lever 68. As is seen in the drawings, cam lever 68 is pivotally mounted on the lower end of lever bar 64 by pin 70, and is provided with a cam surface 72.

A longitudinally-extending pocket 74 is formed in lever bar 64 adjacent its lower end, the pocket fixedly receiving one end of a leaf spring 76, the other end of the spring engaging against cam lever 68 at a point beyond pivot pin 70. Thus, spring 76 constantly tends to urge cam lever 68 in a clockwise direction about its pivot pin 70.

An L-shaped hook 78 has an arm 80 rigidly secured by studs 81 to lever bar 64 intermediate the ends thereof, while a foot portion 82 projects laterally from lever bar 64 (see Figure 2) to engage behind lock-bar 56.

In Figures 2 and 3, it is seen that with grid 30 in its operative position, foot 82 engages against back wall 6 to effectively prevent further downward movement of the grid.

Referring now more specifically to Figure 6, a hydraulic pump 84 is mounted on standards 86 and comprises a cylindrical casing 96 having an opening 88 adjacent end wall 100, and a second opening 90 adjacent end wall 101, the openings being interconnected by conduit 92.

A vertical plate 94 projects inwardly from casing 96 adjacent end wall 100 and is of a length less than the diameter of the casing, to form a passage 98. Plate 94 and end wall 100 cooperate to form a guide for gravity-operated valve 102 having valve seat 104 communicating with opening 88.

Apertures 106 and 108, diametrically opposite openings 88 and 90, respectively, are interconnected by conduit 110, valve 114 and conduit 112.

Valve 114 is controlled by handle 116, sweeping across a scale 117 embossed on panel 14, and is connected with the handle by shaft 118.

A reciprocating piston 120 operates within casing 96 between plate 94 and end wall 101. One end of a piston rod 122 is connected with piston 120, and the other end thereof projects through end wall 101 and is slidably mounted in support 124. A helicoidal spring 126 is mounted around rod 122 and engages, at one of its ends, the support 124. The other end of the spring abuts a collar 128 slidably mounted on rod 122, which, in turn, is in constant contact with a bell crank lever 130.

The bell crank lever 130 is pivoted adjacent one of its ends at 132 to a support 134 mounted on base 4. Lever 130 carries a substantially L-shaped bracket which extends laterally from one of its sides and comprises an arm 136 and leg 138, the latter being bent parallel to bell crank lever 130. A roller 140 is rotatably supported on leg 138 and bell crank lever 130. As seen in Figure 2, the roller is disposed transversely across the rotational planes of lever bars 44 and 64, and the arcuate path traced by roller 140 is such as to permit it to intersect the arcuate paths traced by either of the lever bars 44 or 64.

Bell crank lever 130 is connected to piston rod 122 by means of the rigid pin 142 carried by piston rod 122, the pin being slidably mounted in slot 144 formed in bell crank lever 130. Movement in either direction of piston rod 122 imparts a corresponding arcuate movement of bell crank lever 130 and the roller 140 carried thereby.

A switch 148 having an actuating toggle 150 disposed in the path of arcuate movement of switch arms 57 and 59 is secured to back wall 6. Leads (not shown) connect conventional heating elements of grids 30 and 32 with switch 148, and leads 152 and 154 connect the latter with switch 156 provided with a manually-operated toggle 158. Power cable 160 connects switch 156 with a suitable source of electrical energy.

Having described the component elements of this invention in detail, the operation of the device is as follows:

Assuming that a baking operation has just been completed, grid 32 has assumed the dotted line position shown in Figure 2, and the waffle has been discharged therefrom. Grid 30 remains in the position shown in Figures 1 to 4, inclusive. Cable 160 has been connected with a source of electrical energy, switch 156 has been closed and toggle 150 has been moved upwardly to open switch 148 interrupting the flow of current to the heating elements of grids 30 and 32. Bell crank lever 130 has moved to its dotted line position, as shown in Figure 5, the free end 58 of bar 56 is disengaged from lever bar 44 and has pivoted downwardly to a position in front of foot portion 82 of hook 78. Lever bar 44, now free of bar 56, has pivoted to a vertical position under the force of gravity.

Lever bar 64 retains the position shown in Figures 3 and 4.

Handle 31 of grid 30 is now grasped by the operator and the grid is rotated upwardly to the substantially vertical position shown in full lines in Figure 5. As this operation is carried out, foot 82 engages behind bar 56 rotating it upwardly until its free end 58 slides within passage 46 in locking engagement with notch 62. As bar 56 is rigidly secured to shaft 28 on which grid 32 is fixedly mounted, grid 32 is moved to its horizontal position and maintained therein by the locking connection of lever bar 44 and bar 56. As grid 32 assumes this position, switch arm 57 is rotated downwardly to engage toggle 150, closing switch 148 to complete the circuit to the heating elements of grids 30 and 32.

During the upward movement of lever bar 64, cam lever 68 engages against roller 140 and pivots on pin 70 to permit lever bar 64 to continue its arcuate path.

Batter is then placed on grid 32, and grid 30 is rotated downwardly to the position shown in Figures 1, 2 and 3. As this operation is carried out, lever bar 64 is rotated downwardly to bring cam surface 72 of cam lever 68 into contact with roller 140 (see Figure 5). Since abutment 66 prevents cam lever 68 from rotating in a clockwise direction, roller 140 and bell crank lever 130 are forced to pivot clockwise about pivot 132 (see Figure 5).

The rotation of bell crank lever 130 produces relative movement of pin 142 in slot 144, moving piston rod 122 and piston 120 laterally to the right as shown in Figures 3 and 6.

As roller 140 is moved through its arcuate path, it engages against cam lever 50 which pivots on pin 52 on lever bar 44, thereby permitting roller 140 to pass beneath lever bar 44.

The arcuate paths of roller 140 and lever bar 64 diverge as grid 30 gradually approaches its operative position, and cam surface of cam lever 50 is withdrawn from engagement with roller 140, whereby tension spring 126 now exerts its force on collar 128 which engages against bell crank lever 130. The force effects a counterclockwise movement of bell crank lever 130 and reverses the direction of the movement of piston rod 122 and piston 120.

As piston 120 moves laterally to the left, as viewed in Figure 6, fluid in casing 96 forces valve 102 to seat, and the fluid is also forced through conduit 110, valve 114, conduit 112, and returns to the other side of the piston 120.

Control of the rate of flow is established by manipulation of valve 114 by manually-operated handle 116, and this control establishes the predetermined time interval for the baking operation as will be made clear.

As roller 140 gradually retraces its arcuate path in the reverse direction, it approaches and engages against cam surface 54 of cam lever 50. Abutment 48 prevents the cam lever from pivoting on pin 52, and hence, lever bar 44 is slowly pivoted clockwise on pin 42. Continued movement of roller 140 and lever bar 44 results in the disengagement of notch 62 from lever bar 44 and the engagement of notch 60 therewith.

Since grid 32 is supported in its operative position by the interlocking engagement of bar 56 with lever bar 44, the grid 32 pivots slightly downwardly away from grid 30 by the force of gravity when the disengagement takes place to permit the waffle to loosen.

Further relative movement of roller 140 and lever bar 44 disengages notch 60 from bar 44, freeing the end 58 from passage 46, and grid 32 then rotates downwardly to the dotted line position shown in Figure 2, and the waffle is discharged therefrom.

In accompaniment with this operation, bar 56 rotates counterclockwise and rotates switch arm 59 into engagement with toggle 150 to open switch 148, thereby breaking the circuit to the heating elements of grids 30 and 32.

Lever bar 44, under gravity, returns to its vertical position, and bell crank lever 130 moves to its dotted line position shown in Figure 5. The apparatus is then in readiness to repeat the baking cycle.

To obtain consistent results, the operator should, when baking the initial waffle, close valve 114 for a short period to permit the grids to achieve their proper baking temperature.

It is to be understood that while but one form of the invention has been described and illustrated, the same has been offered merely by way of example, and the scope of the invention is limited only by the appended claims.

I claim:

1. Baking apparatus comprising a base, supports mounted on said base, a pair of shafts rotatably mounted on said supports, a baking grid mounted on each of said shafts and rotatable therewith, said grids being rotatable toward and away from each other to baking and non-baking positions, a bar notched at one of its ends and having the other end thereof fixedly secured to one of said shafts for rotation therewith, a lever bar having one of its ends pivotally supported above said base and having a transverse passage therethrough, said notched end of said bar being received within said passage and engaging against said lever bar to lock one of said grids in its baking position, and means engaging the other end of said lever bar for pivoting said lever bar out of locking engagement with said bar, whereby said one grid moves to its inoperative position.

2. Baking apparatus comprising a base, supports mounted on said base, a pair of shafts rotatably mounted on said supports, a baking grid mounted on each of said shafts and rotatable therewith, said grids being rotatable toward and away from each other to baking and non-baking positions, a bar having one of its ends fixedly secured on one of said shafts and having a plurality of stepped notches formed in the other of its ends, a lever bar pivotally mounted at one of its ends above said base, said lever bar having a transverse passage therethrough, said notched end of said bar being received within said passage and having one of said notches in engagement with said lever bar to lock one of said grids in a first baking position, means engaging against the other end of said lever bar to successively disengage and engage other of said notches with said lever bar to support said one grid in other baking positions, and said last-named means disengaging said lever bar from said bar whereby said one grid rotates to its non-baking position.

3. Baking apparatus comprising a base, supports mounted on said base, a pair of shafts rotatably supported on said supports, a pair of baking grids having electric heating elements respectively mounted on said shafts, said grids being rotatable toward and away from each other to baking and non-baking positions, a pair of switch-operating arms mounted for rotation with one of said shafts, a switch supported on said base, an electric circuit including said heating elements and said switch, means on the other of said shafts for rotating said one shaft and associated grid to baking position and simultaneously actuating one of said switch arms to close said switch to energize said heating elements as the grid associated with the other of said shafts is rotated to non-baking position, means operable upon the return of said last-named grid to its baking position for controlling the heating period for said grids, and means operable after a predetermined interval of time for actuating the other of said switch arms to open said switch and de-energize said heating elements.

4. Baking apparatus comprising a base, supports mounted on said base, a pair of shafts rotatably mounted on said supports, a baking grid mounted on each of said shafts and rotatable therewith, said grids being rotatable toward each other into baking positions and away from each other into non-baking positions, a bar having one of its ends fixedly secured to one of said shafts for rotation therewith, a lever bar having one of its ends pivotally supported above said base and engageable intermediate its ends with the other end of said bar when the shaft carrying the latter bar has been rotated in a direction to cause movement of its baking grid toward and into the baking position, and means engaging the other end of said lever bar for effecting the movement of said lever bar out of engagement with said bar whereby said one grid is moved into its non-baking position.

THOMAS HAL SARCHET.

REFERENCES CITED

The following references are of record in the file of this patent:

UNITED STATES PATENTS

| Number | Name | Date |
|---|---|---|
| 474,601 | Horan | May 10, 1892 |
| 1,257,513 | Messmer | Feb. 26, 1918 |
| 1,656,662 | Carter | Jan. 17, 1928 |
| 1,809,112 | Criner | June 9, 1931 |
| 1,978,872 | Wharton | Oct. 30, 1934 |
| 1,979,845 | Schalles | Nov. 6, 1934 |
| 2,317,225 | Schara | Apr. 20, 1943 |
| 2,344,842 | Weeks | Mar. 21, 1944 |
| 2,389,434 | Huck | Nov. 20, 1945 |
| 2,393,559 | Pappas | Jan. 22, 1946 |